(12) United States Patent
Aoki

(10) Patent No.: US 7,907,386 B2
(45) Date of Patent: Mar. 15, 2011

(54) MULTILAYER CAPACITOR AND MOUNTED STRUCTURE THEREOF

(75) Inventor: Takashi Aoki, Tokyo (JP)

(73) Assignee: TDK Corporation, Tokyo (JP)

(*) Notice: Subject to any disclaimer, the term of this patent is extended or adjusted under 35 U.S.C. 154(b) by 282 days.

(21) Appl. No.: 12/362,041

(22) Filed: Jan. 29, 2009

(65) Prior Publication Data
US 2009/0231779 A1   Sep. 17, 2009

(30) Foreign Application Priority Data
Mar. 14, 2008   (JP) .................................. 2008-066329

(51) Int. Cl.
H01G 4/228 (2006.01)
H01G 4/06 (2006.01)
H01G 4/005 (2006.01)
(52) U.S. Cl. ...................... 361/306.3; 361/311; 361/303
(58) Field of Classification Search .......... 361/303–305, 361/311, 306.1, 306.2, 306.3, 309
See application file for complete search history.

(56) References Cited

U.S. PATENT DOCUMENTS

| 7,411,776 | B2* | 8/2008 | Aoki ........................... 361/306.3 |
| 7,420,795 | B2* | 9/2008 | Togashi et al. ............. 361/306.3 |
| 7,428,135 | B2* | 9/2008 | Togashi et al. ................ 361/303 |
| 7,502,216 | B2* | 3/2009 | Lee et al. .................... 361/306.3 |
| 7,558,049 | B1* | 7/2009 | Togashi et al. ............. 361/306.3 |
| 2002/0071238 | A1* | 6/2002 | Kuroda et al. ............. 361/306.1 |
| 2005/0219792 | A1* | 10/2005 | Togashi et al. ............. 361/306.3 |
| 2005/0264977 | A1* | 12/2005 | Togashi ...................... 361/306.3 |
| 2006/0007634 | A1* | 1/2006 | Togashi et al. ............. 361/306.3 |

FOREIGN PATENT DOCUMENTS

JP   A-2003-168621   6/2003

* cited by examiner

*Primary Examiner* — Eric Thomas
(74) *Attorney, Agent, or Firm* — Oliff & Berridge, PLC

(57) ABSTRACT

In a multilayer capacitor, widths of lead conductors of internal electrode and widths of lead conductors of internal electrode in an ESR control section are smaller than any one of widths of internal electrode and widths of internal electrode in a capacitance section. This narrows cross sections of the conductor portions connecting between the internal electrodes and the external electrodes, so as to her increase ESR. The widths of the respective lead conductors in the ESR control section are wider than widths of respective lead conductors in the capacitance section. This effectively prevents open failure and improves a yield of products.

5 Claims, 6 Drawing Sheets

(a)

(b)

(a)

(b)

(a)

(b)

MULTILAYER CAPACITOR AND MOUNTED STRUCTURE THEREOF

BACKGROUND OF THE INVENTION

1. Field of the Invention

The present invention relates to a multilayer capacitor and a mounted structure of the multilayer capacitor.

2. Related Background Art

There is a hitherto-known multilayer capacitor having a laminate in which dielectric layers and internal electrodes are alternately laminated together, and external electrodes and terminal conductors formed on side faces of the laminate and electrically isolated from each other.

As a multilayer capacitor of this type, there is, for example, the multilayer capacitor described in Japanese Patent Application Laid-open No. 2003-168621. This multilayer capacitor has four types of internal electrodes. Each of two types of internal electrodes among them has an electrode portion to form a capacitance, and a lead conductor connected to the electrode portion and to a terminal conductor. Each of the other two types of internal electrodes has a lead conductor connected to a terminal electrode and a lead conductor connected to an external electrode.

SUMMARY OF THE INVENTION

The multilayer capacitor as described above is used, for example, as a decoupling capacitor in IC. Under recent circumstances toward higher speed and lower voltage of IC, the multilayer capacitor is required to achieve both of increase in ESR (Equivalent Series Resistance) and decrease in ESL (Equivalent Series Inductance).

In the multilayer capacitor described in the aforementioned Laid-open No. 2003-168621, the lead conductors of the latter two types of internal electrodes have the width equal to that of the internal electrodes, and there is thus a room for improvement in terms of the increase in ESR. However, if the width of the lead conductors is simply decreased, so-called open failure, which is failure in exposing the lead conductors in the surface of the laminate, will become likely to occur during polishing the laminate by barrel polishing or the like. If the open failure occurs, failure in electric conduction will occur between the internal electrodes and the external electrodes, which will affect a yield of products.

The present invention has been accomplished in order to solve the above problem and an object of the present invention is to provide a multilayer capacitor realizing the increase in ESR and the decrease in ESL and preventing the occurrence of open failure, and a mounted structure of the multilayer capacitor.

In order to solve the above problem, a multilayer capacitor according to the present invention is a multilayer capacitor comprising: a laminate in which a plurality of internal electrodes are laminated together with a dielectric layer in between; a first external electrode and a second external electrode formed on one end face and on the other end face, respectively, of the laminate; and a first terminal conductor and a second terminal conductor formed on respective side faces intersecting with each of the end faces of the laminate, so as to be opposed to each other, wherein the laminate has: a capacitance section in which a first internal electrode connected to a first polarity and a second internal electrode connected to a second polarity are alternated with at least one layer of the dielectric layer in between; and an ESR control section having a third internal electrode arranged on one side in a laminate direction of the capacitance section and connected to the first polarity, and a fourth internal electrode arranged on the other side in the laminate direction of the capacitance section and connected to the second polarity, wherein in the capacitance section, the first internal electrode is connected through a first lead conductor to the first terminal conductor only and the second internal electrode is connected through a second lead conductor to the second terminal conductor only, wherein in the ESR control section, the third internal electrode is connected through a third lead conductor to the first terminal conductor and through a fourth lead conductor to the first external electrode, and the fourth internal electrode is connected through a fifth lead conductor to the second terminal conductor and through a sixth lead conductor to the second external electrode, and wherein widths of the third to sixth lead conductors are smaller than widths of the first internal electrode and the second internal electrode and larger than widths of the first lead conductor and the second lead conductor.

In this multilayer capacitor, the internal electrodes in the capacitance section are connected each to the terminal conductor only and the internal electrodes in the ESR control section are connected each to the terminal conductor and to the external electrode. Therefore, the terminal conductors to which the internal electrodes are connected in parallel, are connected in series to the external electrodes, whereby a higher ESR is achieved when compared with the case where the internal electrodes are connected in parallel to the external electrodes as in the conventional technology. Since the widths of the third to sixth lead conductors in the ESR control section are smaller than the widths of the first internal electrode and the second internal electrode in the capacitance section, a cross section of the conductors is narrowed thereby, so as to achieve further increase in ESR.

In this multilayer capacitor, the first internal electrode and the second internal electrode connected to the different polarities are alternated in the capacitance section, and the first lead conductor connecting the first internal electrode and the first terminal conductor and the second lead conductor connecting the second internal electrode and the second terminal conductor extend in opposite directions toward the side faces opposed to each other in the laminate. Therefore, electric currents flow in opposite directions in a capacitance-forming region in the first internal electrode and in a capacitance-forming region in the second internal electrode, whereby magnetic fields generated by flow of electric currents cancel out each other in part, so as to enable reduction in ESL.

Furthermore, in this multilayer capacitor, the widths of the third to sixth lead conductors in the ESR control section are larger than the widths of the first lead conductor and the second lead conductor in the capacitance section, whereby the third to sixth lead conductors are readily exposed in the end faces and the side faces of the laminate during polishing the laminate by barrel polishing or the like. The ESR control section is located so as to sandwich the capacitance section in the laminate direction and the third to sixth lead conductors are located nearer the ridge parts of the laminate. The ridge parts are portions that are polished faster than the other portions. Therefore, the third to sixth lead conductors located nearer the ridge parts of the laminate are more certainly exposed in the end faces and the side faces of the laminate. Because of the above configuration, the open failure is effectively prevented in this multilayer capacitance.

Preferably, the width of the fourth lead conductor is smaller than the width of the third lead conductor and the width of the sixth lead conductor is smaller than the width of the fifth lead conductor. In this case, the cross section of the conductors is more narrowed, so as to achieve further increase in ESR.

Preferably, a distance between an internal electrode in the ESR control section and an internal electrode adjacent thereto in the capacitance section is longer than a distance between internal electrodes adjacent to each other in the capacitance section. Since the ESR control section comes to have a larger resistance, there is a concern of heat generation due to the ripple. Therefore, heat radiation is improved by securing the sufficient distance to the internal electrode in the capacitance section. Since the third to sixth lead conductors are located nearer the ridge parts of the laminate, the open failure is more certainly prevented thereby.

Preferably, the fourth lead conductor, when viewed from the laminate direction of the laminate, is exposed in the one end face of the laminate from a position nearer the second terminal conductor, and the sixth lead conductor, when viewed from the laminate direction of the laminate, is exposed in the other end face of the laminate from a position nearer the first terminal conductor. In this case, the fourth lead conductor and the sixth lead conductor are located much nearer the ridge parts of the laminate and the open failure is much more certainly prevented thereby.

A mounted structure of a multilayer capacitor according to the present invention is a mounted structure of a multilayer capacitor in which the multilayer capacitor as set forth is mounted on a substrate, wherein only the first external electrode and the second external electrode are joined to the substrate.

In the mounted structure of the multilayer capacitor, the terminal conductors to which the internal electrodes are connected in parallel, are connected in series to the external electrodes, whereby a higher ESR is achieved when compared with the case where the internal electrodes are connected in parallel to the external electrodes as in the conventional technology. Furthermore, electric currents flow in opposite directions in a capacitance-forming region in the first internal electrode and in a capacitance-forming region in the second internal electrode, whereby magnetic fields generated by flow of electric currents cancel out each other in part, so as to enable reduction in ESL.

The multilayer capacitor and the mounted structure of the multilayer capacitor according to the present invention are provided while realizing the increase in ESR and the decrease in ESL and preventing the occurrence of open failure.

DESCRIPTION OF THE PREFERRED EMBODIMENTS

The preferred embodiments of the multilayer capacitor and the mounted structure of the multilayer capacitor according to the present invention will be described below in detail with reference to the drawings.

Figure 1:
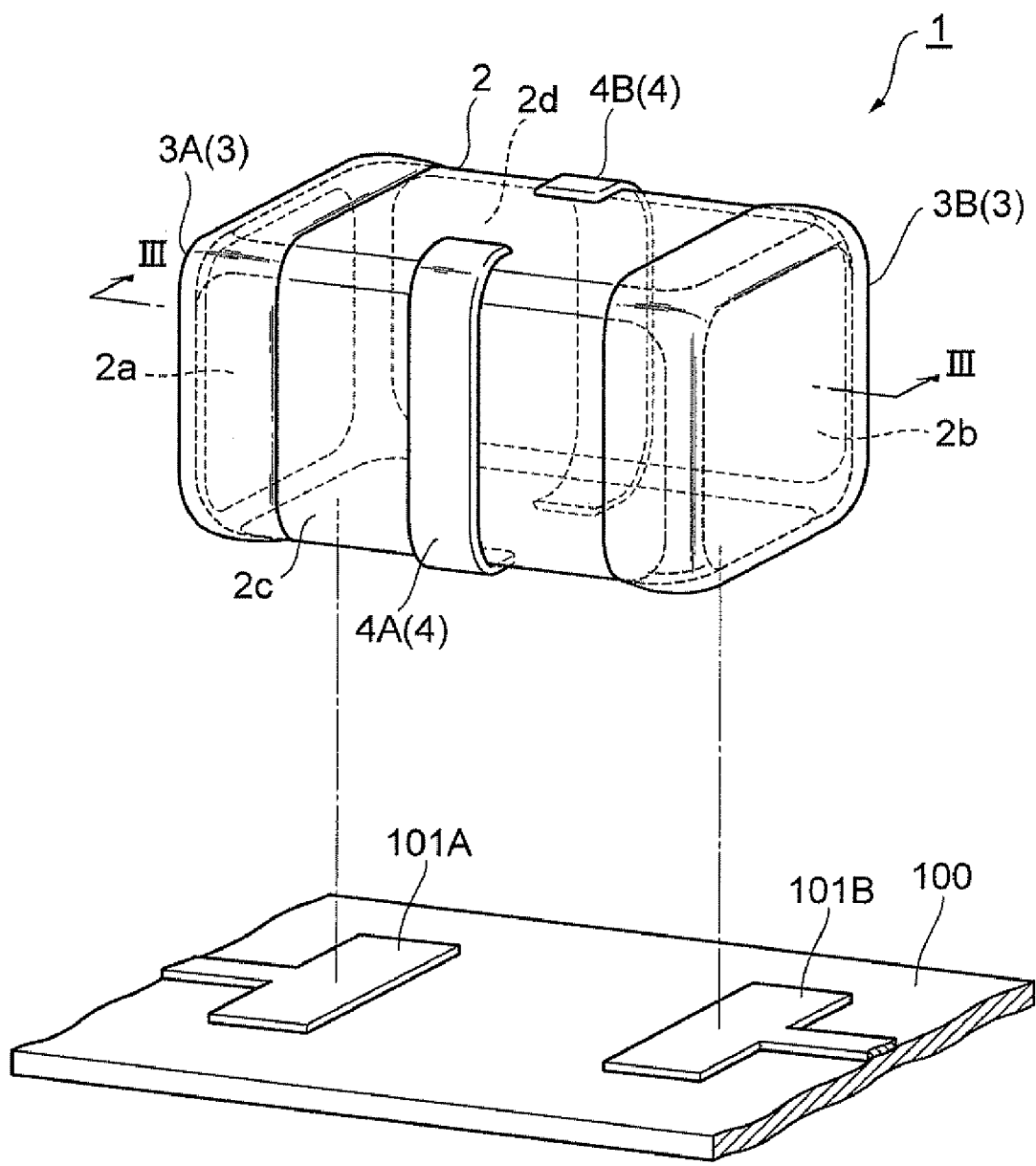
FIG. 1 is a perspective view showing an embodiment of the mounted structure of the multilayer capacitor according to the present invention.
Figure 2:
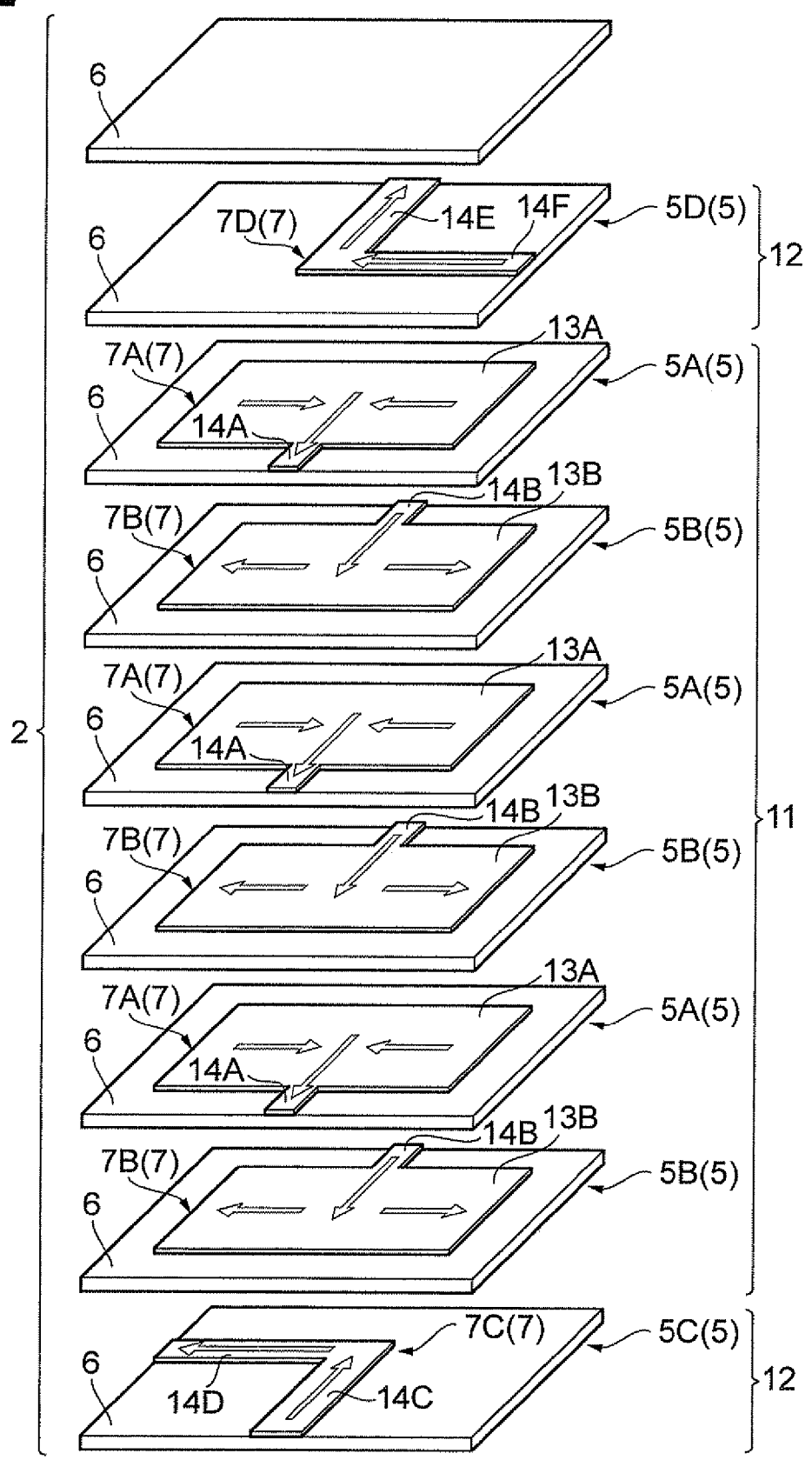
FIG. 2 is a drawing showing a layer structure of the multilayer capacitor shown in FIG. 1.

FIG. 1 is a perspective view showing an embodiment of the mounted structure of the multilayer capacitor according to the present invention. FIG. 2 is a drawing showing a layer structure of the multilayer capacitor shown in FIG. 1, and FIG. 3 is a sectional view along line III-III in FIG. 1.

Figure 3:
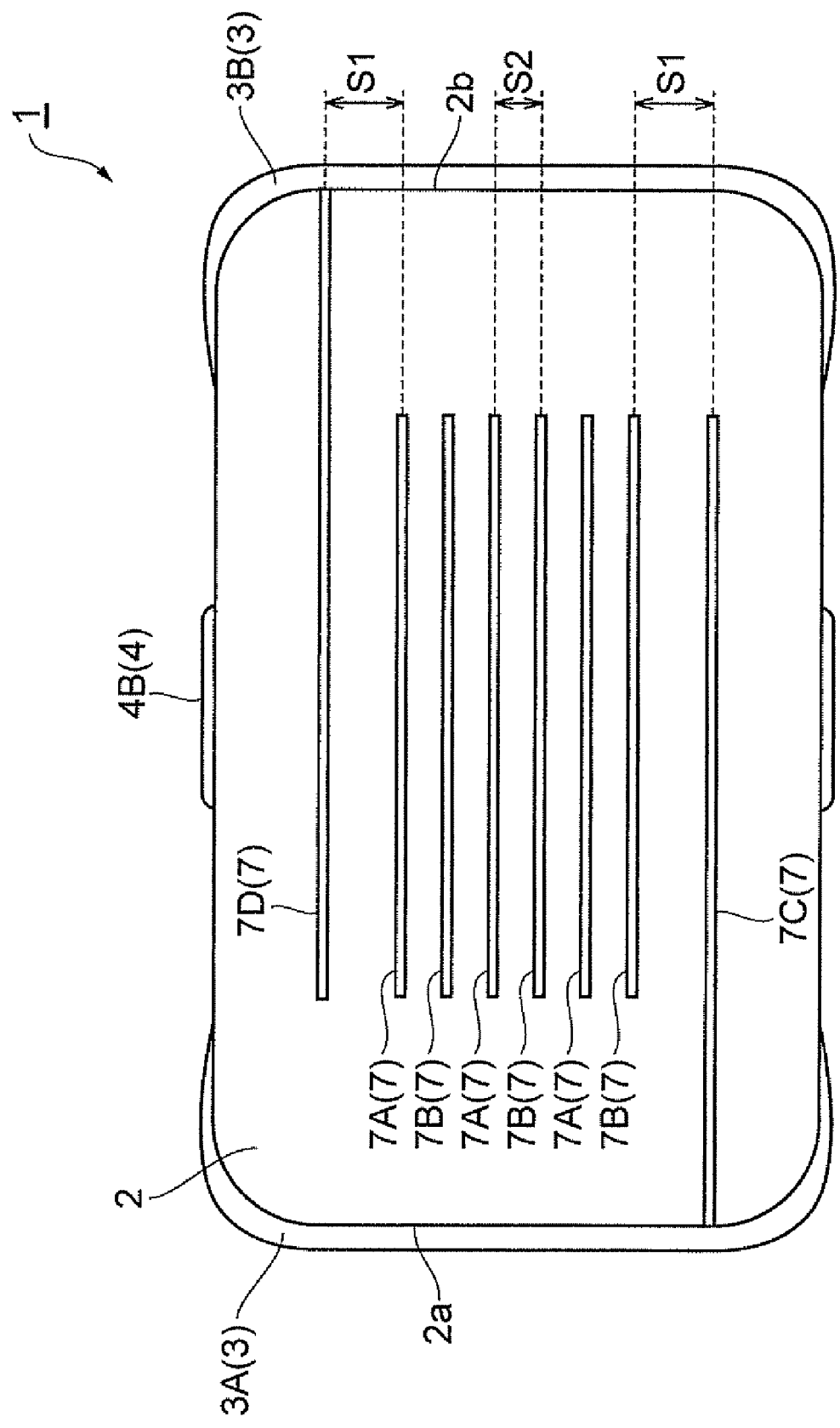
FIG. 3 is a sectional view along line III-III in FIG. 1.

As shown in FIGS. 1 to 3, the multilayer capacitor 1 has a laminate 2 of a nearly rectangular parallelepiped shape, external electrodes 3 (3A, 3B) formed on end faces of the laminate 2, and terminal conductors 4 (4A, 4B) formed on side faces of the laminate 2.

The laminate 2, as shown in FIG. 2, is formed with a plurality of complex layers 5 in each of which an internal electrode 7 is formed in a different pattern on a dielectric layer 6, and dielectric layers 6 laid on the outermost layers of each complex layer 5 and functioning as protecting layers. Each dielectric layer 6 is composed of a sintered body of a ceramic green sheet containing a dielectric ceramic and each internal electrode 7 is composed of a sintered body of an electroconductive paste. The dielectric layers are integrally formed so that no border can be visually recognized between the dielectric layers 6, 6 in the practical multilayer capacitor 1.

The external electrodes 3 and terminal conductors 4 are made by firing an electroconductive paste containing electroconductive metal powder and glass frit. The external electrodes 3 are electrodes to be connected to predetermined polarities on the occasion of mounting the multilayer capacitor 1 on a mounting substrate. The terminal conductors 4 are conductors that connect the internal electrodes 7 belonging to below-described capacitance section 11 in the laminate 2, to each other in parallel, and so-called NC (No Contact) conductors not to be connected directly to the mounting substrate.

The external electrode (first external electrode) 3A is an electrode to be connected, for example, to the positive polarity (first polarity) upon mounting the multilayer capacitor 1 on the substrate, and is formed so as to cover one end face 2a in the longitudinal direction of the laminate 2. The external electrode (second external electrode) 3B is an electrode to be connected, for example, to the negative polarity (second polarity) upon mounting the multilayer capacitor 1 on the substrate, and is formed so as to cover the other end face 2b in the longitudinal direction of the laminate 2.

The terminal conductor (first terminal conductor) 4A is formed on one side face 2c along a laminate direction among the side faces perpendicular to the one end face 2a and the other end face 2b of the laminate 2, and the terminal conductor (second terminal conductor) 4B is formed on the other side face 2d opposed to the side face 2c. The terminal conductors 4A, 4B extend in a beltlike shape in the aforementioned laminate direction on the side faces 2c, 2d and have pad portions projecting onto the end faces in the laminate direction of the laminate 2. The external electrodes 3A, 3B and the terminal conductors 4A, 4B are spaced apart at predetermined intervals and are electrically isolated from each other.

A substrate 100 used in mounting of the multilayer capacitor 1 has a positive land pattern 101A and a negative land pattern 101B. The positive land pattern 101A and the negative land pattern 101B are formed, for example, in a beltlike shape along the width direction of the external electrode 3A and the external electrode 3B and are connected to respective predetermined circuit wires. In a mounted structure of the multilayer capacitor 1, the external electrode 3A is joined to the positive land pattern 101A and the external electrode 3B to the negative land pattern 101B. The terminal conductor 4A and terminal conductor 4B are joined to neither of the positive land pattern 101A and the negative land pattern 101B.

Namely, only the external electrode 3A and external electrode 3B are joined to the substrate 100 in the mounted structure of multilayer capacitor 1.

The configuration of the laminate 2 will be described below in further detail.

The laminate 2, as shown in FIGS. 2 and 3, has a capacitance section 11 contributing mainly to the capacitance of the multilayer capacitor, and an ESR control section 12 to control the ESR of the multilayer capacitor 1.

Figure 4:
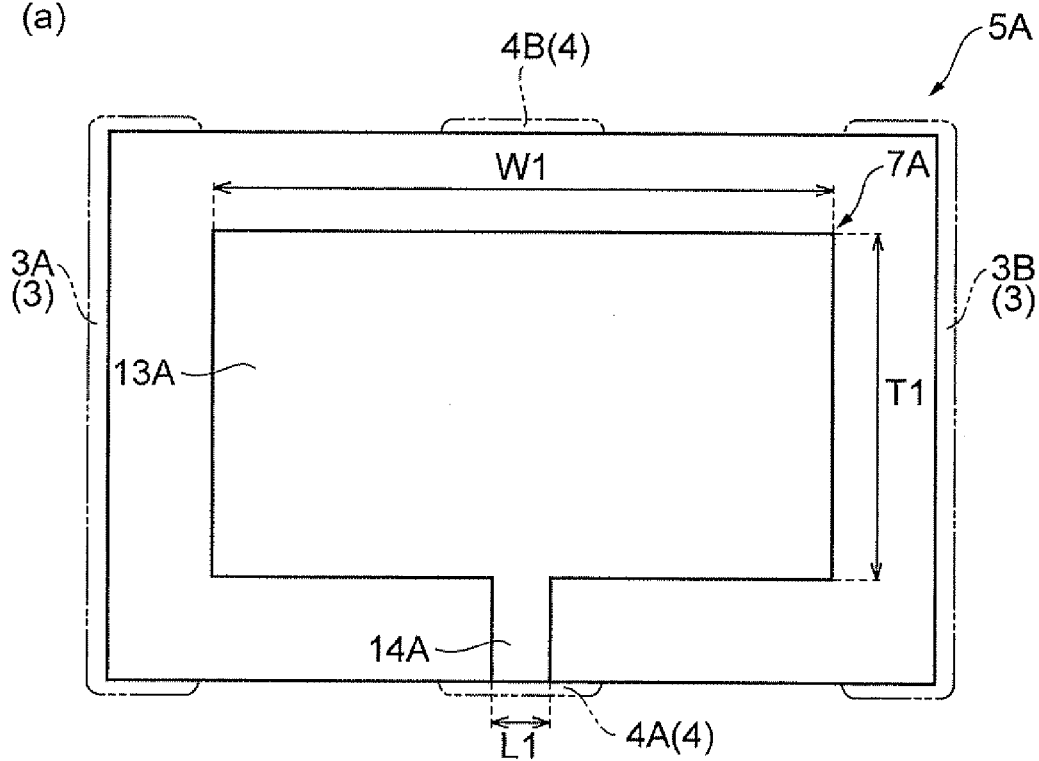
FIG. 4 is a drawing showing complex layers in a capacitance section.
Figure 4:
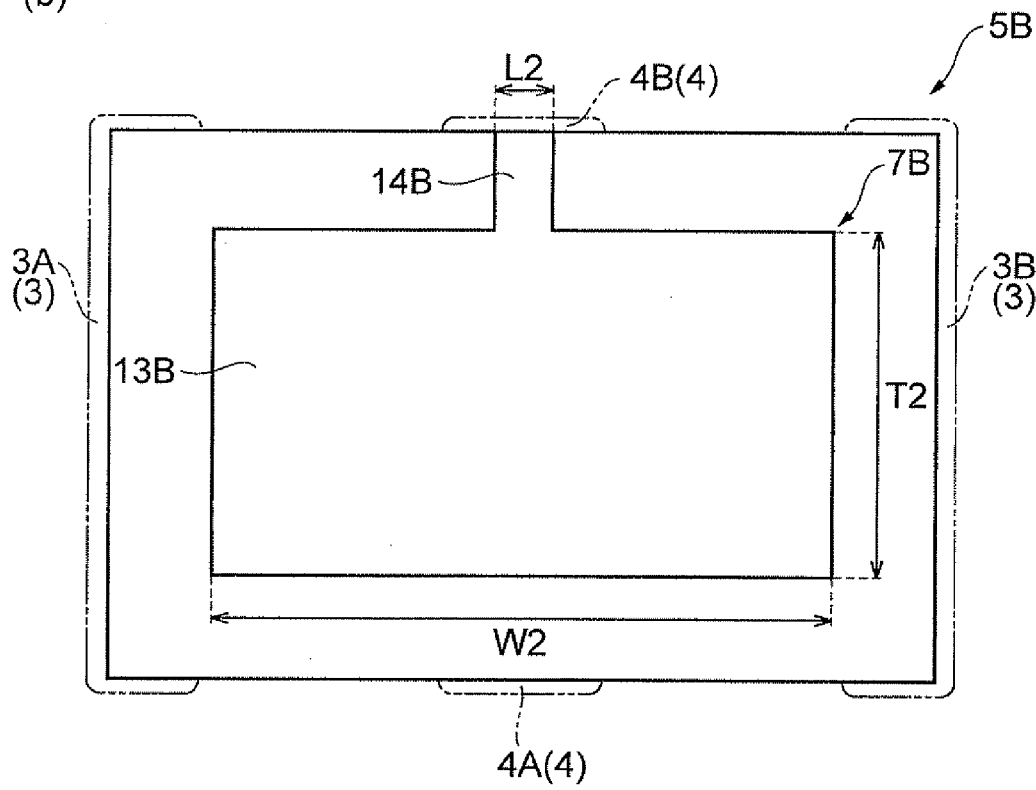

The capacitance section 11, as shown in FIG. 4, is formed in a structure in which two types of complex layers 5A, 5B of different internal electrode patterns are alternately laminated in multiple repetitions. The internal electrode (first internal electrode) 7A of the complex layer 5A, as shown in FIG. 4(a), has a main electrode portion 13A formed in a central region, and a lead conductor (first lead conductor) 14A drawn out from one side of the main electrode portion 13A.

The main electrode portion 13A is, for example, of a nearly rectangular parallelepiped shape in which the width in the longitudinal direction is W1 and the width in the transverse direction is T1. The lead conductor 14A is, for example, of a beltlike shape having the width L1. An end of the lead conductor 14A is exposed in the side face 2c of the laminate 2 and connected to the terminal conductor 4A.

The internal electrode (second internal electrode) 7B of the complex layer 5B, as shown in FIG. 4(b), has a main electrode portion 13B formed in a central region, and a lead conductor (second lead conductor) 14B drawn out from one side of the main electrode portion 13B. The main electrode portion 13B is, for example, of a nearly rectangular parallelepiped shape in which the width in the longitudinal direction is W2 and the width in the transverse direction is T2. In the present embodiment the main electrode portion 13A and the main electrode portion 13B have the same shape, W1=W2 and T1=T2.

The lead conductor 14B is, for example, of a beltlike shape having the width of L2. An end of the lead conductor 14B is exposed in the side face 2d of the laminate 2 opposite to the lead conductor 14A and connected to the terminal conductor 4B. In the present embodiment the lead conductor 14A and the lead conductor 14B have the same shape, L1=L2.

In the capacitance section 11, an overlap portion between the main electrode portion 13A of the internal electrode 7A and the main electrode portion 13B of the internal electrode 7B, when viewed from the laminate direction, is a capacitance-forming region. In the present embodiment, the entire area of the main electrode portion 13A overlaps with the entire area of the main electrode portion 13B whereby the capacitance-forming region is adequately ensured.

Figure 5:
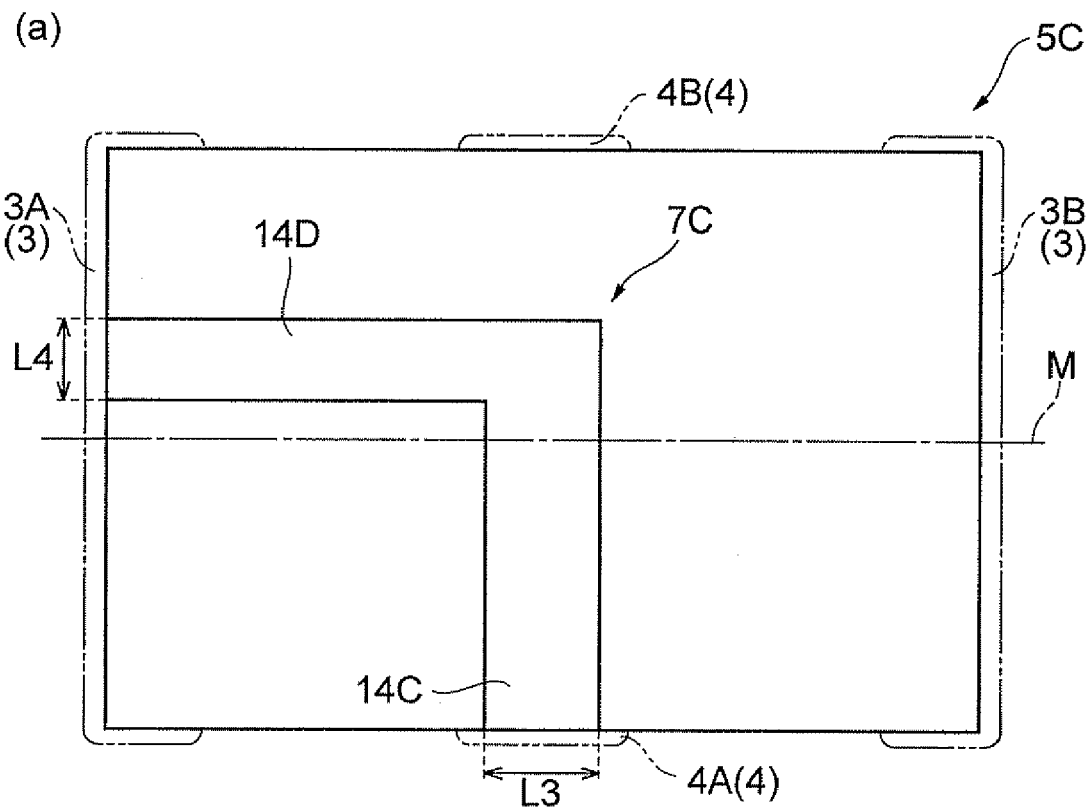
FIG. 5 is a drawing showing complex layers in an ESR control section.
Figure 5:
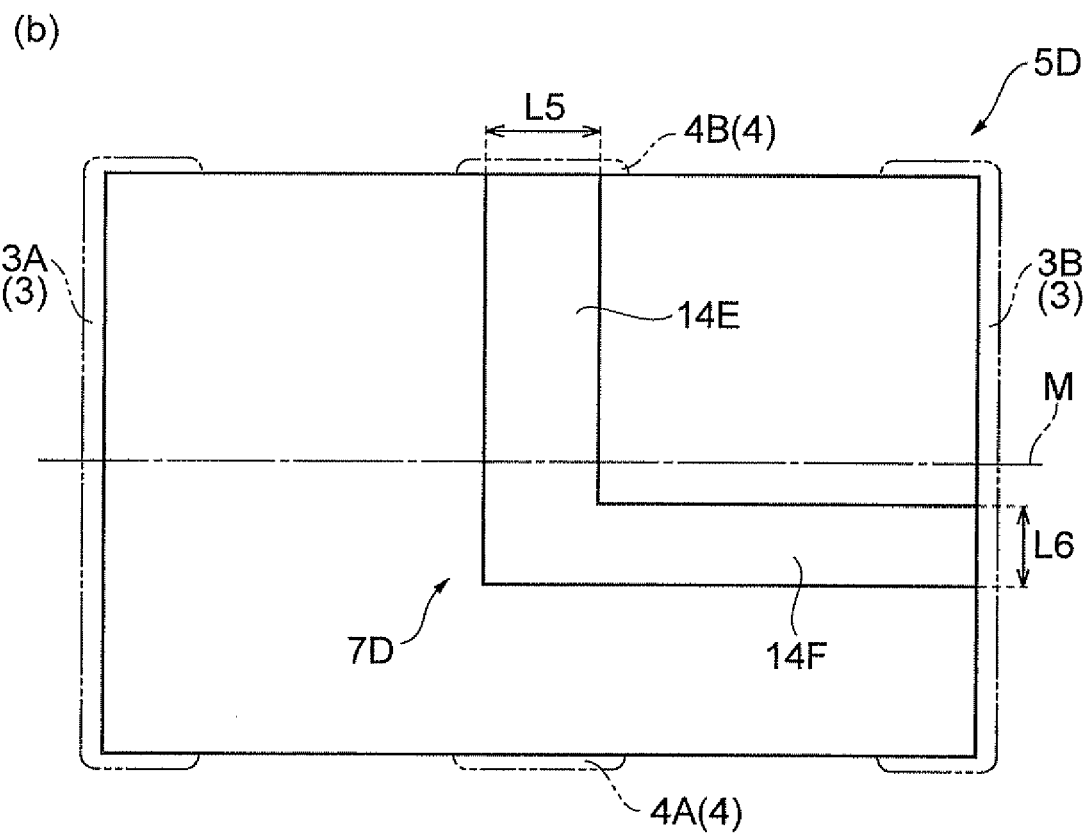

On the other hand, the ESR control section 12 is arranged so as to sandwich the capacitance section 11 when viewed from the laminate direction. The ESR control section 12, as shown in FIG. 5, is composed of two complex layers 5C, 5D of different internal electrode patterns. The internal electrode (third internal electrode) 7C of the complex layer 5C, as shown in FIG. 5(a), has a lead conductor (third lead conductor) 14C extending in a direction connecting the terminal conductors 4A, 4B, and a lead conductor (fourth lead conductor) 14D extending in a direction connecting the external electrodes 3A, 3B.

The lead conductor 14C is, for example, of a beltlike shape having the width of L3. One end of the lead conductor 14C is exposed in the side face 2c of the laminate 2 and connected to the terminal conductor 4A. The other end of the lead conductor 14C is not exposed in the side face 2d of the laminate 2 but is located at a predetermined distance inside from the side face 2d.

The lead conductor 14D is, for example, of a beltlike shape having the width of L4 and is located at a position nearer the terminal conductor 4B than a center line M connecting between the external electrodes 3A, 3B. One end of the lead conductor 14D is exposed in one end face 2a of the laminate 2 from the position nearer the terminal conductor 4B than the center line M, and is connected to the external electrode 3A. The other end of the lead conductor 14D is connected to the other end of the lead conductor 14C.

Because of the configuration of complex layer 5C as described above, the internal electrodes 7A in the capacitance section 11 are connected through the lead conductor 14A to the terminal conductor 4A and further connected through this terminal conductor 4A and the lead conductors 14C, 14D to the external electrode 3A. Therefore, the internal electrodes 7A have the positive polarity in the mounted structure of the multilayer capacitor.

The width L3 of the lead conductor 14C and the width L4 of the lead conductor 14D satisfy the following relation with the longer-side width W1 and the shorter-side width T1 of the internal electrode 7A in the capacitance section 11: L3, L4<W1, T1. Namely, the width L3 of the lead conductor 14C and the width L4 of the lead conductor 14D are smaller than both of the longer-side width W1 and the shorter-side width T1 of the internal electrode 7A.

The width L3 of the lead conductor 14C and the width L4 of the lead conductor 14D also satisfy the following relation with the width L1 of the lead conductor 14A of the internal electrode 7A: L3, L4>L1. Furthermore, the width L3 of the lead conductor 14C and the width L4 of the lead conductor 14D satisfy the following relation: L4<L3. This configuration results in forming a narrow portion with a narrow cross section in the conductor portion connected from the internal electrode 7A to the external electrode 3A.

The internal electrode (fourth internal electrode) 7D of the complex layer 5D, as shown in FIG. 5(b), has a lead conductor (fifth lead conductor) 14E extending in the direction connecting the terminal conductors 4A, 4B, and a lead conductor (sixth lead conductor) 14F extending in the direction connecting the external electrodes 3A, 3B.

The lead conductor 14E is, for example, of a beltlike shape having the width of L5. One end of the lead conductor 14E is exposed in the side face 2d of the laminate 2 and connected to the terminal conductor 4B. The other end of the lead conductor 14E is not exposed in the side face 2c of the laminate 2 but is located at a predetermined distance inside from the side face 2c.

The lead conductor 14F is, for example, of a beltlike shape having the width of L6, and is located at a position nearer the terminal conductor 4A than the center line M connecting between the external electrodes 3A, 3B. One end of the lead conductor 14F is exposed in the other end face 2b of the laminate 2 from the position nearer the terminal conductor 4A than the center line M and connected to the external electrode 3B. The other end of the lead conductor 14F is connected to the other end of the lead conductor 14E.

Because of the configuration of complex layer 5D as described above, the internal electrodes 7B in the capacitance section 11 are connected through the lead conductor 14B to the terminal conductor 4B and further connected through this terminal conductor 4B and the lead conductors 14E, 14F to the external electrode 3B. Therefore, the internal electrodes 7B have the negative polarity in the mounted structure of the multilayer capacitor.

The width L5 of the lead conductor 14E and the width L6 of the lead conductor 14F satisfy the following relation with the longer-side width W2 and the shorter-side width T2 of the internal electrode 7B in the capacitance section 11: L5, L6<W2, T2. Namely, the width L5 of the lead conductor 14E and the width L6 of the lead conductor 14F are smaller than both of the longer-side width W2 and the shorter-side width T2 of the internal electrode 7B.

The width L5 of the lead conductor 14E and the width L6 of the lead conductor 14F also satisfy the following relation with the width L2 of the lead conductor 14B of the internal electrode 7B: L5, L6>L2. Furthermore, the width L5 of the lead conductor 14E and the width L6 of the lead conductor 14F satisfy the following relation: L6<L5. This configuration results in forming a narrow portion with a narrow cross section in the conductor portion connected from the internal electrode 7B to the external electrode 3B.

Furthermore, as shown in FIG. 3, a distance S1 between the internal electrode 7 in the ESR control section 12 and the internal electrode 7 of the capacitance section 11 adjacent to the internal electrode 7 in the ESR control section 12 is longer than a distance S2 between adjacent internal electrodes 7, 7 in the capacitance section 11. A ratio of S1 and S2 is optionally set, for example, in the range of 10-100:1.

In the multilayer capacitor 1 having the configuration as described above, the internal electrodes 7 are connected each to the terminal conductor 4 only in the capacitance section 11 and the internal electrodes 7 are connected each to both of the terminal conductor 4 and the external electrode 3 in the ESR control section 12. Therefore, since the terminal conductors 4 to which the internal electrodes 7 are connected in parallel are connected in series to the corresponding external electrodes 3, a higher ESR is achieved when compared with the case where the internal electrodes 7 are connected in parallel to the external electrodes 3 as in the conventional technology.

In the multilayer capacitor 1, the widths L3, L4 of the lead conductors 14C, 14D of the internal electrode 7C and the widths L5, L6 of the lead conductors 14E, 14F of the internal electrode 7D in the ESR control section 12 are smaller than both of the widths W1, T1 of the internal electrodes 7A and the widths W2, T2 of the internal electrodes 7B in the capacitance section 11. Furthermore, the width L4 of the lead conductor 14D is smaller than the width L3 of the lead conductor 14C and the width L6 of the lead conductor 14F is smaller than the width L5 of the lead conductor 14E. This configuration realizes the narrow cross section of the conductor portions connecting the internal electrodes 7 and the external electrodes 3 and thus achieves further improvement in the ESR.

In the multilayer capacitor 1, the internal electrodes 7A and the internal electrodes 7B connected to the different polarities are alternately arranged in the capacitance section 11, and the lead conductor 14A connecting the internal electrode 7A and the terminal conductor 4A and the lead conductor 14B connecting the internal electrode 7B and the terminal conductor 4B extend in the opposite directions toward the side faces 2c, 2d opposed to each other in the laminate 2. Therefore, as shown in FIG. 2, electric currents flow in opposite directions in the capacitance-forming region in the internal electrode 7A and in the capacitance-forming region in the internal electrode 7B, whereby magnetic fields generated by flow of electric currents cancel out each other in part. This enables reduction in ESL.

On the other hand, in the multilayer capacitor 1, the widths L3-L6 of the respective lead conductors 14C-14F in the ESR control section 12 are larger than the widths L1, L2 of the respective lead conductors 14A, 14B in the capacitance section 11. For this reason, the ends of the lead conductors 14C-14F can be readily exposed in the end faces 2a, 2b and the side faces 2c, 2d of the laminate 2 during polishing the laminate 2 by barrel polishing or the like.

The ESR control section 12 is located so as to sandwich the capacitance section 11 in the laminate direction, whereby each lead conductor 14C-14F is located nearer the ridge part of the laminate 2. The ridge part of the laminate 2 is a portion that is polished faster than the other portions. Therefore, the lead conductors 14C-14F located nearer the ridge parts of the laminate 2 are exposed more certainly in the end faces 2a, 2b and the side faces 2c, 2d of the laminate 2. The above effectively prevents the open failure in the multilayer capacitor 1 and thus improves a yield of products.

Furthermore, in the multilayer capacitor 1, the distance S1 between the internal electrode 7 in the ESR control section 12 and the internal electrode 7 adjacent thereto in the capacitance section 11 is approximately 10 to 100 times longer than the distance S2 between the adjacent internal electrodes 7, 7 in the capacitance section 11. Since in the ESR control section 12 the widths of the lead conductors 14C-14F are made narrow, the resistance increases there, which raises a concern of heat generation due to the ripple. Therefore, heat radiation can be improved by setting the sufficient distance to the internal electrode 7 in the capacitance section 11. Since the lead conductors 14C-14F are located nearer the ridge parts of the laminate 2, the open failure is prevented more certainly thereby.

In the multilayer capacitor 1, the lead conductor 14D is exposed in the one end face 2a of the laminate 2 from the position nearer the terminal conductor 4B, when viewed from the laminate direction of the laminate 2, and the lead conductor 14F is exposed in the other end face 2b of the laminate 2 from the position nearer the terminal conductor 4A, when viewed from the laminate direction of the laminate 2. Since this configuration makes the lead conductor 14D and the lead conductor 14F closer to the corners of the laminate 2, the open failure is further prevented thereby.

The present invention is by no means limited to the above embodiment. For example, the polarities connected to the external electrodes and the internal electrodes in the mounted structure may be opposite to those in the above embodiment. The difference between the distance S1 and the distance S2 between the internal electrodes 7, 7 does not always have to be provided, and the lead conductor 14D and the lead conductor 14F do not always have to be located nearer the terminal conductor 4B and the terminal conductor 4A.

Figure 6:
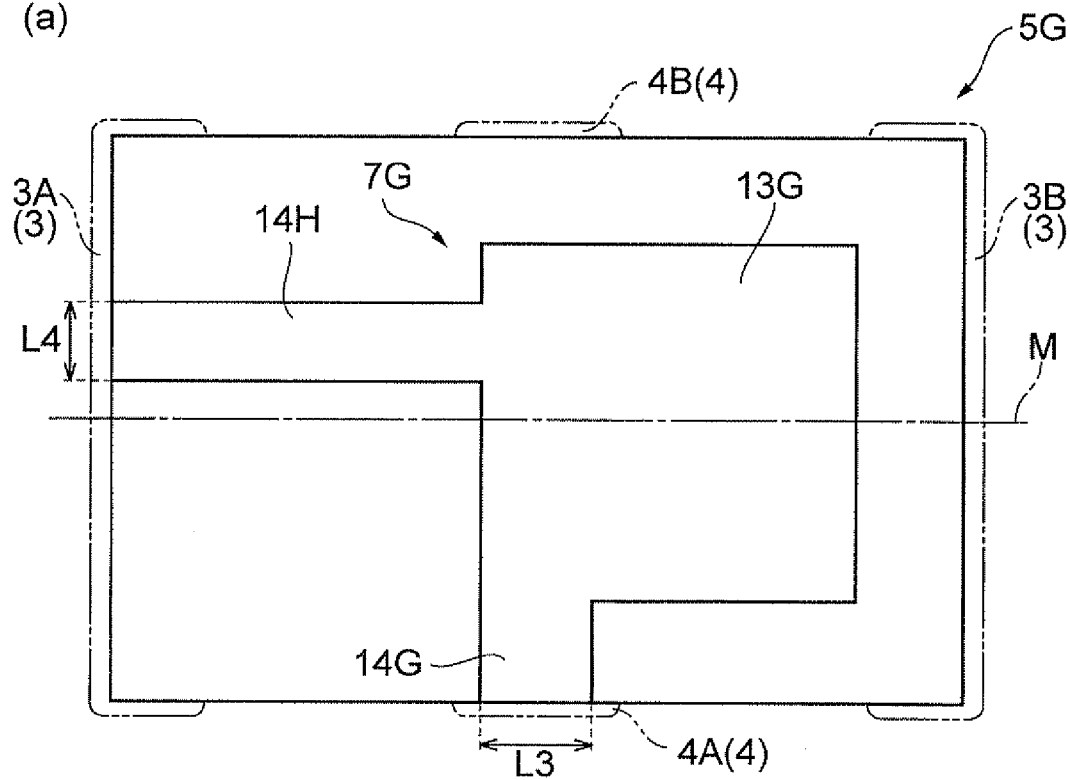
FIG. 6 is a drawing showing complex layers in an ESR control section according to a modification example.
Figure 6:
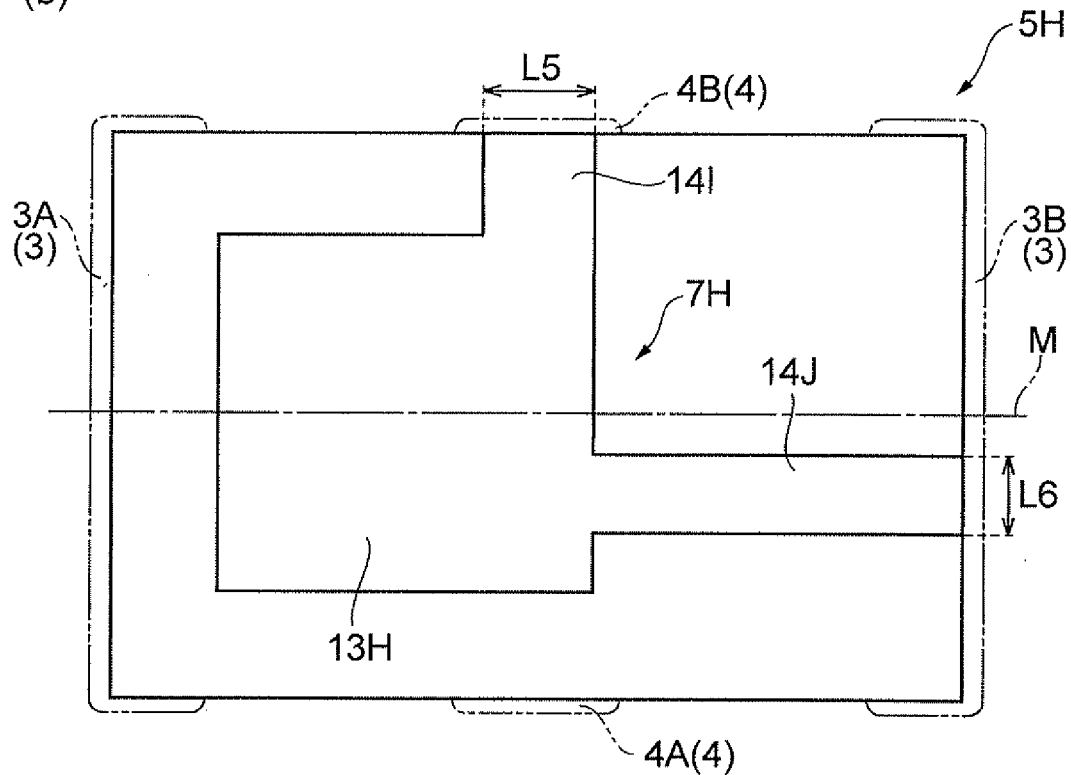

In the above-described embodiment the internal electrode 7C and the internal electrode 7D in the ESR control section 12 are composed of only the lead conductors 14C-14F, but may be constructed with a main control portion as well as the lead conductors, for example, like internal electrode 7G and internal electrode 7H shown in FIG. 6.

In the example shown in FIG. 6(a), the internal electrode 7G in the complex layer 5G has a main electrode portion 13G opposed to a nearly half portion on the external electrode 3B side of the main electrode portion 13A in the internal electrode 7A, a lead conductor 14G connecting the main electrode portion 13G and the terminal conductor 4A, and a lead conductor 14H connecting the main electrode portion 13G and the external electrode 3A. The lead conductor 14G is of a beltlike shape having the width L3 and the lead conductor 14H is of a beltlike shape having the width L4.

In the example shown in FIG. 6(b), the internal electrode 7H in the complex layer 5H has a main electrode portion 13H opposed to a nearly half portion on the external electrode 3A side of the main electrode portion 13B in the internal electrode 7B, a lead conductor 14I connecting the main electrode portion 13H and the terminal conductor 4B, and a lead conductor 14J connecting the main electrode portion 13H and the external electrode 3B. The lead conductor 14I is of a beltlike shape having the width L5 and the lead conductor 14J is of a beltlike shape having the width L6.

When the internal electrodes 7G, 7H in the ESR control section 12 are provided with the respective main electrode portions 13G, 13H as described above, capacitance-forming regions are formed with the main electrode portions 13A, 13B of the internal electrodes 7A, 7B in the capacitance section 11, whereby the capacitance of the multilayer capacitor 1 is more adequately ensured.

What is claimed is:

1. A multilayer capacitor comprising:
a laminate in which a plurality of internal electrodes are laminated together with a dielectric layer in between;
a first external electrode and a second external electrode formed on one end face and on the other end face, respectively, of the laminate; and
a first terminal conductor and a second terminal conductor formed on respective side faces intersecting with each of the end faces of the laminate, so as to be opposed to each other,
wherein the laminate has:
a capacitance section in which a first internal electrode connected to a first polarity and a second internal electrode connected to a second polarity are alternated with at least one layer of the dielectric layer in between; and
an ESR control section having a third internal electrode arranged on one side in a laminate direction of the capacitance section and connected to the first polarity, and a fourth internal electrode arranged on the other side in the laminate direction of the capacitance section and connected to the second polarity,
wherein in the capacitance section,
the first internal electrode is connected through a first lead conductor to the first terminal conductor only and
the second internal electrode is connected through a second lead conductor to the second terminal conductor only,
wherein in the ESR control section,
the third internal electrode is connected through a third lead conductor to the first terminal conductor and through a fourth lead conductor to the first external electrode, and
the fourth internal electrode is connected through a fifth lead conductor to the second terminal conductor and through a sixth lead conductor to the second external electrode, and
wherein widths of the third to sixth lead conductors are smaller than widths of the first internal electrode and the second internal electrode and larger than widths of the first lead conductor and the second lead conductor.

2. The multilayer capacitor according to claim 1, wherein the width of the fourth lead conductor is smaller than the width of the third lead conductor and the width of the sixth lead conductor is smaller than the width of the fifth lead conductor.

3. The multilayer capacitor according to claim 1, wherein a distance between an internal electrode in the ESR control section and an internal electrode adjacent thereto in the capacitance section is longer than a distance between internal electrodes adjacent to each other in the capacitance section.

4. The multilayer capacitor according to claim 1, wherein the fourth lead conductor, when viewed from the laminate direction of the laminate, is exposed in the one end face of the laminate from a position nearer the second terminal conductor, and
wherein the sixth lead conductor, when viewed from the laminate direction of the laminate, is exposed in the other end face of the laminate from a position nearer the first terminal conductor.

5. A mounted structure of a multilayer capacitor in which the multilayer capacitor according to claim 1 is mounted on a substrate,
wherein only the first external electrode and the second external electrode are joined to the substrate.

* * * * *